United States Patent
Kawamoto et al.

(10) Patent No.: US 7,526,671 B2
(45) Date of Patent: Apr. 28, 2009

(54) NETWORK COMMUNICATION SYSTEM

(75) Inventors: Akihiro Kawamoto, Kawasaki (JP);
Kenji Iwasawa, Kawasaki (JP); Shoji Ohshima, Kawasaki (JP); Masahiko Okajima, Kahoku (JP); Nobuyuki Shichino, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 11/531,054

(22) Filed: Sep. 12, 2006

(65) Prior Publication Data
US 2008/0010489 A1 Jan. 10, 2008

(30) Foreign Application Priority Data
May 11, 2006 (JP) ............................. 2006-132425

(51) Int. Cl.
*G06F 11/00* (2006.01)
(52) U.S. Cl. .............................. 714/4; 714/48; 714/53; 709/223; 709/224
(58) Field of Classification Search ...................... 714/4, 714/48, 53; 709/223, 224
See application file for complete search history.

(56) References Cited

U.S. PATENT DOCUMENTS

2003/0009540 A1* 1/2003 Benfield et al. ............. 709/220
2003/0009546 A1* 1/2003 Benfield et al. ............. 709/223
2003/0009547 A1* 1/2003 Benfield et al. ............. 709/223
2005/0188241 A1* 8/2005 Cabezas et al. ................ 714/4

FOREIGN PATENT DOCUMENTS

JP 08-305501 11/1996
JP 2005-197793 7/2005

* cited by examiner

*Primary Examiner*—Robert Beausoliel
*Assistant Examiner*—Charles Ehne
(74) *Attorney, Agent, or Firm*—Staas & Halsey LLP

(57) ABSTRACT

The network communication system is capable of communicating with many internal units at high speed, improving reliability of the system and decreasing a production cost and a development cost. The network communication system comprises a plurality of control units respectively connected to internal LANs, which connect internal units mutually. Each of the control units includes: a port opening/closing unit for selectively setting the control unit in an open state, in which the control unit acts as the unit having a common IP address of the control units with respect to the external network, or in a close state, in which an access to the control unit from the external network is prohibited; and a unit for solving the address duplication, which sets the control unit in the close state and changes the network address of the corresponding internal LAN so as to solve the address duplication. One of the control units is set in the open state, and the rest of the control units is set in the close state.

9 Claims, 5 Drawing Sheets

NETWORK COMMUNICATION SYSTEM

BACKGROUND OF THE INVENTION

The present invention relates to a network communication system comprising: a plurality of internal units; a plurality of internal LANs mutually connecting the internal units, the internal LANs being assigned different IP addresses; and a plurality of control units being respectively connected to the internal LANs.

A monitoring unit or a monitoring system, which is capable of monitoring a status of the system, is employed in a storage system having a plurality of storage units, e.g., magnetic disk units, such as a RAID system.

Japanese Patent Gazette No. 8-305501 discloses a monitoring unit and a monitoring system, which monitors a status of a disk array apparatus (large-capacity external storage unit) by inputting status data, which are outputted from a printer interface of the disk array apparatus, to the monitor unit (computer).

Another conventional monitoring system, which monitors a status of a storage system, will be explained with reference to FIGS. 5 and 6.

FIG. 5 is a block diagram showing a structure for data access of a RAID system, which acts as a storage system. The RAID system 80 comprises: a plurality of drive enclosures (DE) 90, each of which has a magnetic disk unit (storage unit) 94; and a plurality of centralized modules (CM) 92, each of which is capable of accessing the magnetic disk units 94 of the drive enclosures 90 via fiber channel interfaces.

The centralized modules 92 of the RAID system 80 are connected to a server computer S via fiber channel interfaces. The server computer S is capable of accessing the magnetic disk units 94 of the drive enclosures 90 via the centralized modules 92.

Note that, in the monitoring system, the units included in the RAID system 80, e.g., the magnetic disk units 94, the drive enclosures 90, the centralized modules 92, are called "internal units".

FIG. 6 is a block diagram showing a structure for monitoring the drive enclosures 90 and the centralized modules 92 of the RAID system 80. The RAID system 80 includes two monitoring units 96 and 97, each of the monitoring units 96 and 97 is connected to the internal units (the drive enclosures 90 and the centralized modules 92) via independent serial lines. Note that, the serial lines connected to the monitoring unit 96 are shown by solid lines; the serial lines connected to the monitoring unit 97 are shown by dotted lines.

Drive enclosure (DE) monitoring units 98, which manage statuses of the magnetic disk units 94 of the drive enclosures 90, are respectively provided in the drive enclosures 90.

A network port, which can be connected to an external network N, e.g., corporate LAN, is provided to each of the centralized modules 92.

The monitoring units 96 and 97 respectively monitor detected values of voltage sensors, temperature sensors, etc. (not shown), which are provided to the magnetic disk units 94 of the drive enclosures 90 and the centralized modules 92, via the serial lines. When abnormal values, e.g., values greater than threshold values, are detected, the monitoring units 96 and 97 notify the abnormal state to an assigned management computer, which is connected to the external network N, via the centralized modules 92 and the external network N. Further, when the abnormal state is detected, the monitoring unit 96 or 97 sends a command to the internal unit, in which the abnormal state occurs, so as to, for example, urgently turn off a power source of the faulty internal unit.

Even if no abnormal state occurs, the monitoring system sends statuses of the sensors, which are monitored by the monitoring units 96 and 97, to the management computer.

The monitoring units 96 and 97 are connected to multiple (double) networks of the monitor serial lines. With this structure, even if failure is occur in one of the monitoring units or the monitor serial lines connected thereto and a process and communication relating to the monitor cannot be performed, the process and the communication can be performed by the other monitoring unit and the monitor serial lines connected thereto.

To improve performance and reliability of the storage system, e.g., RAID system, redundancy between the system and the sever computer is increased by increasing number of the centralized modules or paths therebetween. Further, the monitoring units monitor not only the centralized modules and the drive enclosures (the storage units) but also other internal units of the storage units, e.g., bus switches of the centralized modules, bus switches between the magnetic disk units included in the drive enclosures.

However, each of the conventional monitoring units serial-communicates with each of the internal units one-on-one. Therefore, if the internal units to be monitored, e.g., centralized modules, bus switches, are increased, the monitoring serial lines and the serial ports of the monitoring units, which corresponds to the monitoring serial lines, must be increased, so that a production cost must be increased.

With increasing number of the internal units to be monitored and a processing speed of the computer, increasing processing speeds of the monitoring units are also required.

However, the conventional monitoring units of the storage system monitor by the serial communication, so it is difficult to increase communication speeds. If the communication speeds are increased, a production cost and a development cost must be increased.

SUMMARY OF THE INVENTION

The present invention was conceived to solve the above described problems.

An object of the present invention is to provide a network communication system, which is capable of communicating with many internal units at high speed, improving reliability of the system and decreasing a production cost and a development cost.

Another object is to provide a storage system, which employs said network communication system and which is capable of highly reliably monitoring the internal units at high speed and decreasing a production cost.

The inventors of the present invention have researched so as to achieve the above described objects and developed internal LANs in a storage system as a communication network for monitoring the internal units of the storage system.

To improve fault tolerance of monitoring units and internal units, a plurality of monitoring units and a plurality of internal LANs, which respectively correspond to the monitoring units, were used. Further, the network communication system and the storage system employing the same were developed so as to solve a problem of address duplication between network addresses of IP addresses, which are respectively assigned to the internal LANs, and a network address assigned to an external network.

The present invention has following structures.

Namely, the network communication system of the present invention comprises: a plurality of internal units; a plurality of internal LANs mutually connecting the internal units, the internal LANs being assigned different IP addresses; and a plurality of control units being respectively connected to the internal LANs, each of the control units includes: an external network port being capable of connecting to an external network; port opening/closing means for selectively setting the control unit in an open state, in which the control unit acts as the unit having a common IP address of the control units with respect to the external network, or in a close state, in which an access to the control unit from the external network is prohibited; means for detecting address duplication between network addresses of the IP addresses, which are respectively assigned to the internal LANs, and a network address assigned to the external network; and means for solving the address duplication, the solving means actuating the port opening/closing means to set the control unit in the close state and changing the network address of the corresponding internal LAN so as to solve the address duplication, and one of the control units is set in the open state, and the rest of the control units is set in the close state.

In comparison with the conventional system, in which a plurality of internal units is connected to serial communication lines, the present invention uses the LANS for communication between the control units and the internal units. With this structure, the communication with many of the internal units can be performed at high speed, and a production cost and a development cost can be reduced. Each of the internal units are connected to the independent LANs, so that they have enough redundancies and fault tolerances of the control units and the internal LANs can be improved. Further, in the network communication system of the present invention, a plurality of the control units are physically connected to the external network via the external network port, and the port opening/closing means makes the external network recognize the control units as one unit. On that basis, the solving means solves the problem of the address duplication between the network addresses of the internal LANs and the network address of the external network.

The network communication system may further comprise means for communicating between the control units, and the solving means changes the state of the control unit to the close state and communicates to other control units, by the communicating means, so as to change the state of one of other control units to the open state when the detecting means detects the address duplication and the control unit is set in the open state.

With this structure, if the network address of the internal LAN corresponding to the control unit in the open state and the network address of the external network are duplicated, the state of one of other control units is changed to the open state. Therefore, the control unit can act as the unit having the IP address with respect to the external network, and the duplicated network address of the internal LAN can be changed so that the problem of the address duplication can be solved.

The network communication system may further comprise: means for communicating between the control units; and internal LAN fault clearing means for changing the state of the control unit to the close state and communicating to other control units, by the communicating means, so as to change the state of one of other control units to the open state when a fault occurs in the internal LAN corresponding to the control unit, which is set in the open state.

With this structure, even if a failure occurs in the control unit in the open state or the internal LAN corresponding to that control unit, another control unit is changed to the open state so that the system can continue the operation.

In the network communication system, each of the control units may be further connected to other internal LANs, and the communicating means may be constituted by the internal LANs.

With this structure, the control units can mutually communicate via the internal LANs.

In the network communication system, each of the control units may include a DHCP server section, which assigns the IP address to the internal unit connected to the corresponding internal LAN on the basis of DHCP, and the solving means may make the DHCP server section change the IP address of the internal unit when the network address of the corresponding internal LAN is changed.

With this structure, IP addresses can be easily assigned to the internal units and easily changed by the DHCP server section.

In the network communication system, the solving mans may firstly attempt to solve the address duplication by a manner of class A, if the address duplication is not solved by the manner of class A, the solving mans may attempt to solve the address duplication by a manner of class B, and if the address duplication is not solved by the manner of class B, the solving mans may attempt to solve the address duplication by a manner of class C.

In the network communication system, each of the control units may further include means for monitoring the internal units via the corresponding internal LAN, and the monitoring means may send status data of the internal units to an assigned equipment connected to the external network.

With this structure, a monitoring system capable of suitably monitoring the internal units can be produced.

The storage system of the present invention comprises: a network communication system; a plurality of storage units, which work as internal units; a plurality of centralized modules, which are used for accessing the storage units and which work as internal units, the network communication system comprises: a plurality of internal LANs mutually connecting the internal units, the internal LANs being assigned different IP addresses; and a plurality of control units being respectively connected to the internal LANs, each of the control units includes: an external network port being capable of connecting to an external network; port opening/closing means for selectively setting the control unit in an open state, in which the control unit acts as the unit having a common IP address of the control units with respect to the external network, or in a close state, in which an access to the control unit from the external network is prohibited; means for detecting address duplication between network addresses of the IP addresses, which are respectively assigned to the internal LANs, and a network address assigned to the external network; means for solving the address duplication, the solving means actuating the port opening/closing means to set the control unit in the close state and changing the network address of the corresponding internal LAN so as to solve the address duplication; and means for monitoring the internal units via the corresponding internal LAN, and the monitoring means sends status data of the internal units to an assigned equipment connected to the external network, and one of the control units is set in the open state, and the rest of the control units is set in the close state.

With this storage system, the control units communicate with the internal units via the LANs, so that the communication with many of the internal units can be performed at high speed, the internal units can be promptly monitored and a production cost and a development cost can be reduced. Further, each of the internal units are connected to the independent LANs, so that they have enough redundancies and fault tolerances of the control units and the internal LANs can be improved.

The network communication system of the present invention is capable of performing the communication with many of the internal units at high speed, improving reliability and reducing the production cost and the development cost.

The storage system of the present invention uses said network communication system, so that the internal units can be promptly and reliably monitored and the low production cost can be realized.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
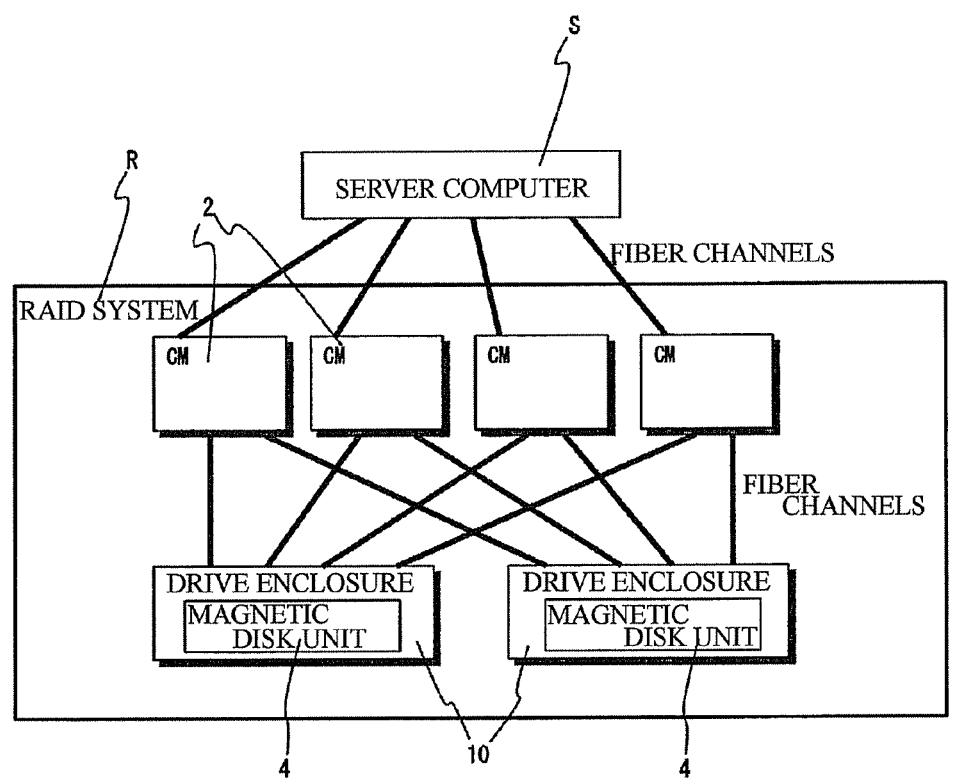
FIG. 1 is a block diagram showing a structure for data access of a storage system including the network communication system of the present invention.

FIG. 1 is a block diagram showing a structure for data access of a RAID system R, which is an example of a storage system including the network communication system of the present invention. The RAID system R comprises: a plurality of drive enclosures (DE) 10, each of which has a magnetic disk unit (storage unit) 4; and a plurality of centralized modules (CM) 2, each of which is capable of accessing the magnetic disk units 4 of the drive enclosures 10 via fiber channel interfaces.

The centralized modules 2 of the RAID system R are connected to a server computer S via fiber channel interfaces. The server computer S is capable of accessing the magnetic disk units 4 of the drive enclosures 10 via the centralized modules 2.

Note that, in the following description, the units included in the RAID system R, e.g., the magnetic disk units 4, the drive enclosures 10, the centralized modules 22, are called "internal units".

Figure 2:
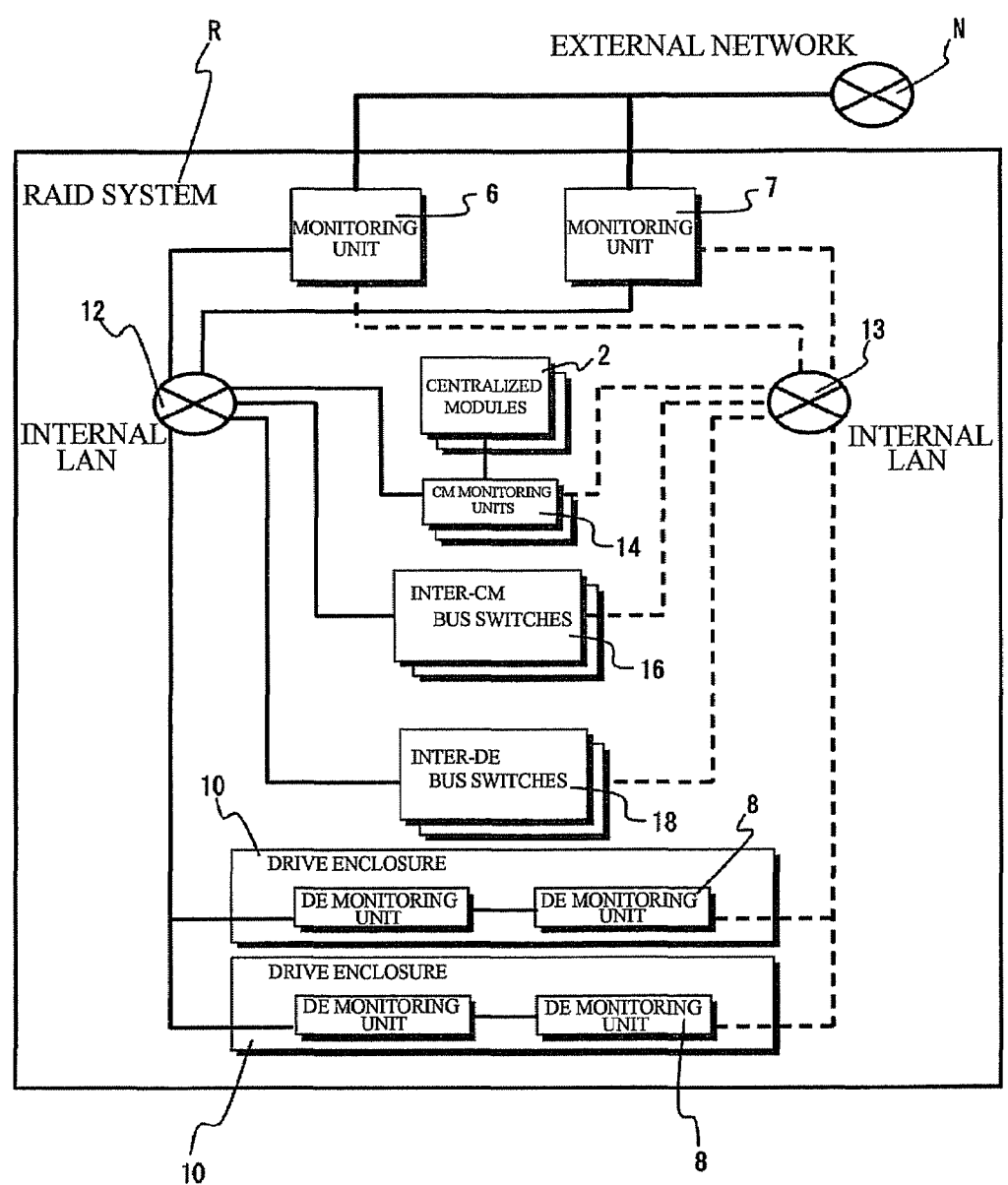
FIG. 2 is a block diagram showing a structure for monitoring internal units of the storage system including the network communication system of the present invention.

FIG. 2 is a block diagram showing a structure for monitoring the inner units, e.g., the drive enclosures 10, the centralized modules 2, of the RAID system R. The RAID system R includes two monitoring units 6 and 7, each of the monitoring units 6 and 9 is connected to the internal units via internal LANs 12 and 13 for monitor. Namely, each of the monitoring units 6 and 9 is connected to the both of internal LANs 12 and 13. The monitoring units 6 and 7 and the internal units have LA ports for connecting to the internal LANs 12 and 13. Note that, each of the internal LANs 12 and 13 is constituted by Ethernet (R), and a protocol of TCP/IP is used therein.

In FIG. 2, lines connected to the internal LAN 12 are shown by solid lines; lines connected to the internal LAN 13 are shown by dotted lines.

Each of the centralized modules 2 is connected to a CM monitoring unit 14, and its status is monitored thereby. The CM monitoring unit 14 is connected to the internal LANs 12 and 13. The monitoring units 6 and 7 monitor statuses of the centralized modules 2 via the CM monitoring units 14.

Each of the drive enclosures 10 has a DE monitoring unit 8, which monitors a status of the magnetic disk unit 4 of the drive enclosure 10. Each of the DE monitoring units 8 is connected to the internal LANs 12 and 13. The monitoring units 6 and 7 monitor statuses of the magnetic disk units 4 of the drive enclosures 10 via the DE monitoring units 8.

The RAID system R includes inter-CM bus switches 16, which are used for communication between the centralized modules 2, and inter-DE bus switches 18, which are used for communication between the magnetic disk units 4 of the drive enclosures 10.

In the RAID system R of the present embodiment, which is an example of the storage system, the inter-CM bus switches 16 and the inter-DE bus switches 18 are monitored by the monitoring units 6 and 7 as the internal units. Namely, the inter-CM bus switches 16 and the inter-DE bus switches 18 are also connected to the internal LANs 12 and 13, and their statuses are monitored by the monitoring units 6 and 7.

The internal LANs 12 and 13 are indirectly connected to the centralized modules 2, which are the internal units, via the CM monitoring units 14 and indirectly connected to the magnetic disk units 4, which works as storage units, via the DE monitoring units 8. In the present invention, the internal units may be directly or indirectly connected to the internal LANs, so the connecting method is not limited.

As described above, the monitoring units 6 and 7 are connected to the internal LANs 12 and 13 and the external network N. The external network N is constituted by Ethernet (R), and the protocol of TCP/IP is used therein as well as the internal LANs 12 and 13.

Next, details of the monitoring unit 6, which acts as a control unit, will be explained with reference to FIG. 3.

Figure 3:
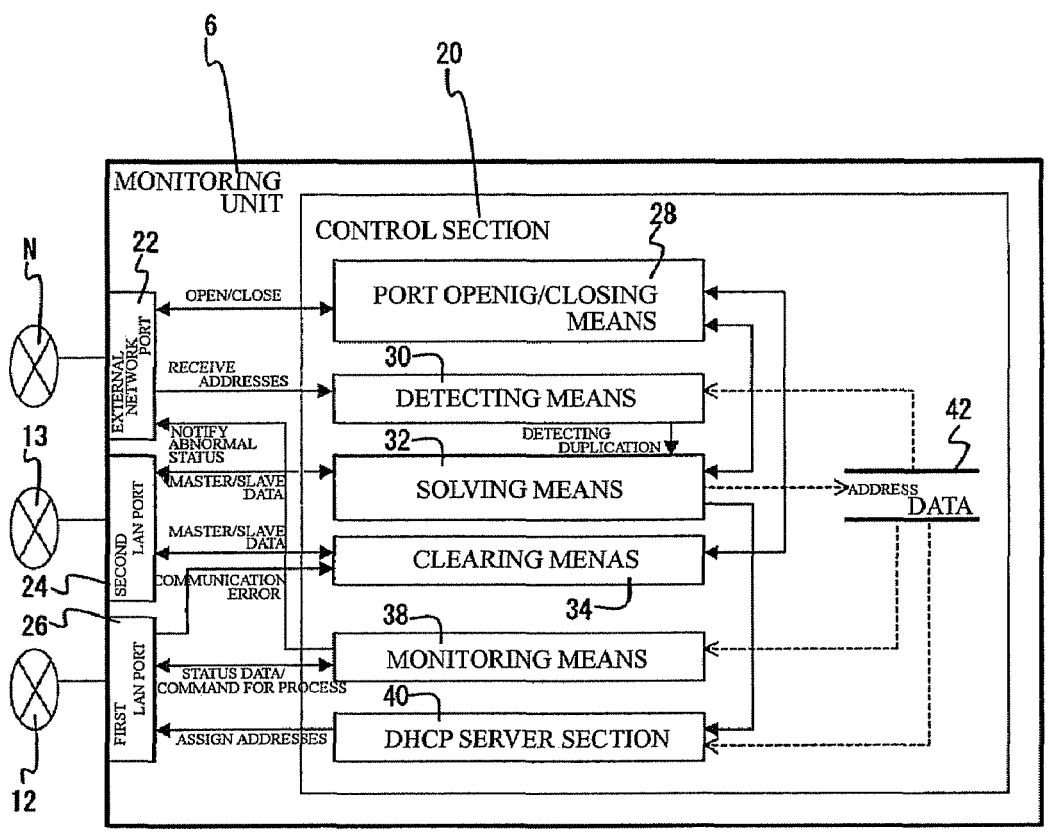
FIG. 3 is a block diagram of a monitoring unit, which acts as a control unit.

FIG. 3 is a block diagram of the monitoring unit 6. The monitoring unit 6 includes: an external network port 22, which can be connected to the external network N; a first LAN port 26, which can be connected to the internal LAN 12 corresponding to the monitoring unit 6; and a second LAN port 24, which can be connected to another internal LAN, i.e., the internal LAN 13 corresponding to the monitoring unit 7. The monitoring unit 6 is capable of communicating with the other monitoring unit 7 via the second LA port 24 and the internal LAN 13, which act as means for communicating between the control units.

The monitoring unit 6 further includes a microcomputer control section 20, which is constituted by a CPU, LSIs, memories, etc. The microcomputer control section 20 executes firmware programs and functions of the LSIs by the CPU so as to perform as means 28 for opening/closing external port, means 30 for detecting address duplication, means 32 for solving the address duplication, means 34 for clearing fault of the internal LAN and a DHCP server section 40.

Note that, an inner structure of the monitoring unit 7 is the same as that of the monitoring unit 6, so explanation will be omitted.

In the monitoring unit 7, conditions for connecting to the internal LANs 12 and 13 and some settings are different from those of the monitoring unit 6. Thus, the differences will be explained.

In the monitoring unit 7, the internal LAN 13 corresponding to the monitoring unit 7 is connected to the first LA port 24; the internal LAN 12 corresponding to the monitoring unit 6 is connected to the second LA port 24. The monitoring unit 7 is capable of communicating with the other monitoring unit 6 via the second LA port 24 and the internal LAN 12, which act as the means for communicating between the control units. Further, setting an open state and a close state, which are set by the port opening/closing means 28, and setting a network address of the internal LAN are different from those of the monitoring unit 6. Details will be described later.

Port Opening/Closing Means 28

The port opening/closing means 28 selectively sets the monitoring unit in the open state, in which the monitoring unit acts as the unit having a common IP address of the monitoring units 6 and 7 with respect to the external network N, or in the close state, in which an access to the monitoring unit from the external network N is prohibited.

The port opening/closing means 28 is started by a computer connected to the external network N, and a user is capable of initially setting the external port in the open state or the close state by the computer. Note that, the open state or the close state, which is set by the port opening/closing means 28 may be changed by the solving means 32 and the clearing means 34.

In the RAID system R, one of the monitoring units 6 and 7 is set in the open state and the other monitoring unit is set in the close state by their port opening/closing means 28.

Note that, in case of having three monitoring units or more, one of the monitoring units is set in the open state and the rest monitoring units are set in the close state.

The user is capable of optionally setting an IP address of the control unit, which will be made public on the external network N, by the computer, in the open state. In the present invention, a common IP addresses of the control units, which will be made public on the external network N, is used. In the present embodiment, the common IP address on the external network N is "10. 2. 1. 5".

The internal LANs 12 and 13 independently connect the internal units each other, and different network addresses of the IP addresses are assigned thereto. Namely, multiple (double) of the internal LANs, each of which mutually connects the internal units, are formed in the RAID system R.

For example, in the RAID system R of the present embodiment, an assigned initial network address of the internal LAN 12 is "10. 1. 0. x", and an assigned initial network address of the internal LAN 13 is "10. 1. 1. x". Subnet masks of the initial network addresses are "10. x. x. x".

Note that, data indicating the network addresses of the internal LANs corresponding to the monitoring units are stored in rewritable storing means 42, e.g., flash ROM, as address data (see FIG. 3).

Namely, the monitoring unit 6 set in the open state acts as the unit having the assigned IP address "10. 2. 1. 5" with respect to the external network N; the network address "10. 1. 0. x" is used in the internal LAN 12. When the state of the monitoring unit 7 is changed from the close state to the open state by the port opening/closing means 28, the monitoring unit 7 acts as the unit having the assigned IP address "10. 2. 1. 5" with respect to the external network N; the network address "10. 1. 1. x" is used in the internal LAN 13. This action can be performed by a known NAT (Network Address Translation) technology.

If the both of the monitoring units 6 and 7 are set in the open state, two units having the same IP address "10. 2. 1. 5" exist in the external network N. Therefore, when one of the monitoring units 6 and 7 is in the open state, the other monitoring unit is absolutely set in the close state.

In the RAID system R, multiple (double) of the internal LANs 12 and 13, which respectively correspond to the monitoring units 6 and 7, are provided to have redundancy. Therefore, even if a failure occurs in one of the monitoring systems, the monitoring work can be performed by the other monitoring system.

DHCP Server Section 40

The DHCP server 40 assigns the IP addressed to the internal units connected to the internal LANs 12 and 13.

A DHCP client section (not shown) is included in each of the internal units, the DHCP client section requests the monitoring unit 6 (the DHCP server section 40) to assign the IP address when the RAID system R is started. Then, the DHCP server section 40 generates and assignes the unique IP addresses, e.g., "10. 1. 0. 3", to the internal units on the basis of the network address "10. 1. 0. x" of the internal LAN 12 and unique host addresses of the internal units (the DHCP client sections).

For example, in the present embodiment, a lease term of the IP addresses, which are assigned to the internal units by the DHCP server section 40, is set to 30 seconds. After assigning the IP addresses, the DHCP client section of each of the internal units requests the DHCP server section 40 to extend the lease term every 30 seconds, i.e., elapsing the lease time. The DHCP server section 40 permits the extension so as to maintain the assigned IP addresses of the internal units.

Means 30 for Detecting Address Duplication

The detecting means 30 is actuated, by user, through the computer connected to the monitoring unit 6 and detects address duplication between the network address of the IP address, e.g., "10. 1. 0. x", which has been assigned to the internal LAN 12, and the network address assigned to the external network N.

For example, if the network address of the external network N is "10. 1. 0. x" (the subnet mask is "255. 255. 255. 0"), i.e., it is equal to that of the internal LAN 12, or if the network address of the external network N is "10. x. x. x" (the subnet mask is "255. 0. 0. 0"), i.e., the network address of the internal LAN 12 is included in a range of the IP addresses used in the external network N, the address duplication occurs.

Means 32 for Solving Address Duplication

When the detecting means 30 detects the address duplication, the solving means 32 changes the network address of the internal LAN 12 so as to solve the address duplication.

Figure 4:
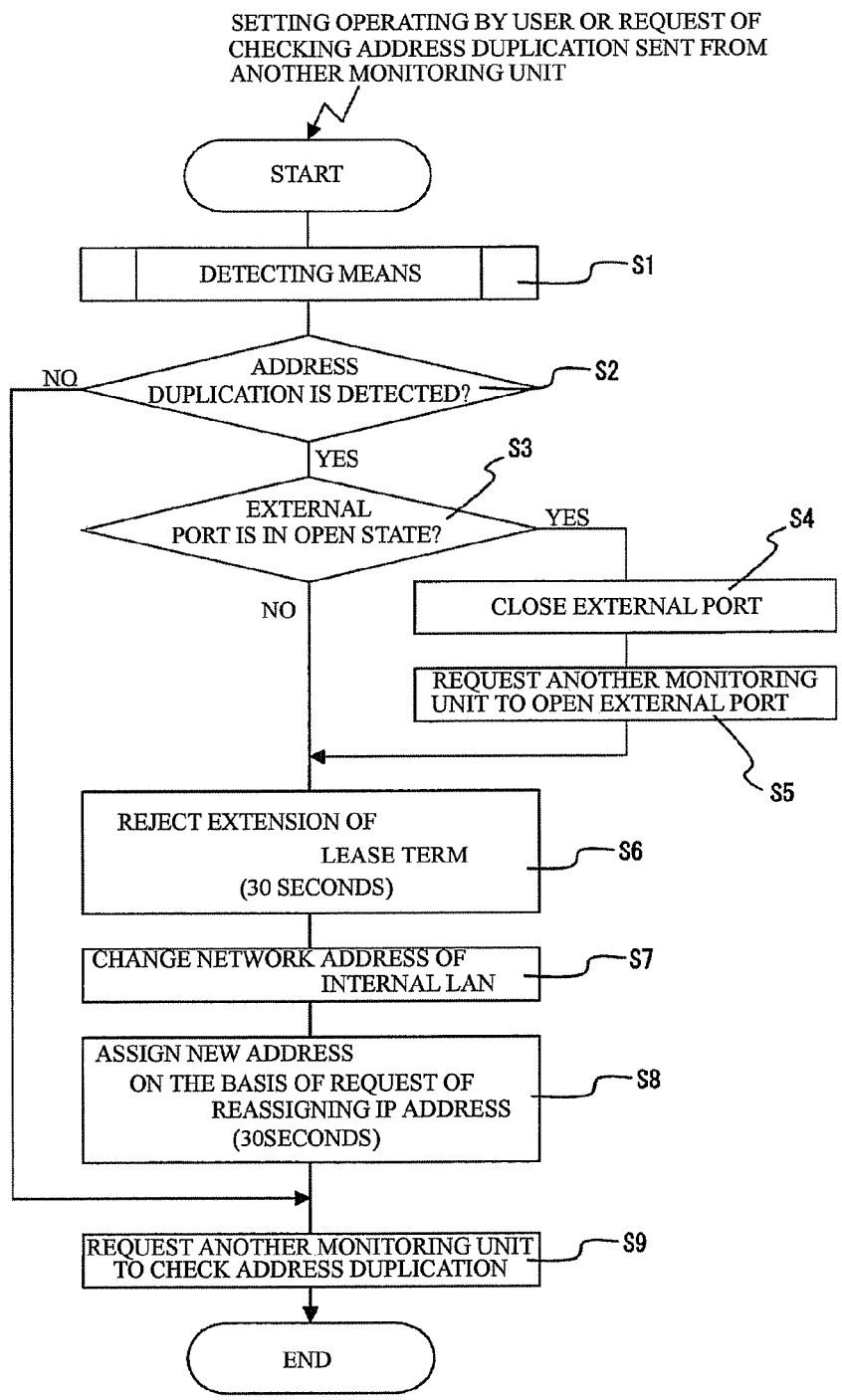
FIG. 4 is a flow chart of a process performed by solving means.
Figure 5:
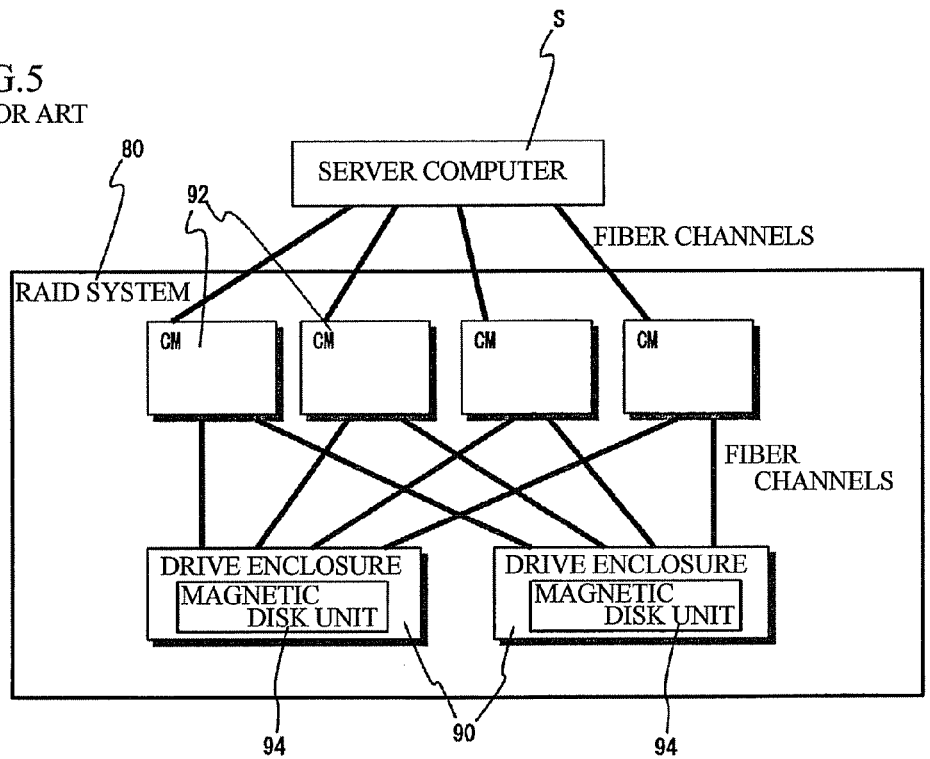
FIG. 5 is a block diagram showing the structure for data access of the conventional storage system.

The solution process of the solving means 32 will be explained with reference to a flow chart of FIG. 4.

Firstly, the detecting means 30 is actuated by a command inputted by the user or a request signal sent from another monitoring unit (Step S1).

In Step S2, the detecting means checks if the address duplication occurs or not. If the address duplication is detected, the process goes to Step S3. In the Step S3, the solving means 32 checks if the external network port of the monitoring unit is set in the open state by the port opening/closing means 28 or not. If the external network port is set in the open state, the external network port is set in the close state by the port opening/closing means 28 (Step S4). Then, the solving means 32 requests the other monitoring unit to set the external network port in the open state (Step S5).

When the monitoring unit receives the request, the monitoring unit is set in the open state by the port opening/closing means 28. Then, the monitoring unit acts as the unit having the IP address "10. 2. 1. 5", instead of the monitoring unit sent the request for opening the port, with respect to the external network N.

With this action, the RAID system R is capable of minimizing unmonitorable statuses in the external network N.

Note that, if the solving means 32 actuates the detecting means 30 and sets the monitoring unit, which has received the request for opening the port, in the open state when no address duplication occurs between the network address of the internal LAN corresponding to said monitoring unit and the network address of the external network N, the address duplication between the network addresses of the internal LANs and the external network N can be securely prevented.

In the Step S3, if the external network port is not set in the open state by the port opening/closing means 28, or after completing the Step S5, the solving means 32 goes to Step S6 and makes the DHCP server section 40 reject the request for extending the lease term of the IP address, which is sent from the DHCP client section of the internal unit. Namely, the extension of the lease term is prohibited. The DHCP server section 40 maintains the state of performing that process for at least the predetermined lease term, e.g., 30 seconds in the present embodiment. Therefore, the request for extending the lease terms of the IP addresses of the corresponding internal units (the DHCP client sections) is rejected, so that the IP addresses are assigned to no internal units (the DHCP client sections).

Successively, the solving means 32 changes the network address of the corresponding internal LAN so as to solve the address duplication (Step S7), and the changed network address is stored in the storing means 42.

At that time, the solving means 32 firstly attempts to solve the address duplication by a manner of class A, if the address duplication is not solved by the manner of class A, the solving mans 32 attempts to solve the address duplication by a manner of class B, and if the address duplication is not solved by the manner of class B, the solving mans 32 attempts to solve the address duplication by a manner of class C. For example, when the network address of the external network N is "10. 1. 0. x" (the subnet mask is "255. 255. 255. 0"), the solving means 32 attempts to solve the address duplication by the manner of class A. If the network address of the internal LAN is changed to "10. 2. 1. x" (the subnet mask is "255. 255. 255. 0"), the address duplication is solved.

On the other hand, when the network address of the external network N is "10. x. x. x " (the subnet mask is "255. 0. 0. 0"), the address duplication cannot be solved by the manner of class A. In this case, the solving means 32 attempts to solve the address duplication by the manner of class B. For example, the solving means 32 changes the network address by changing the internal LAN to "172. 16. 1. 0".(the subnet mask is "255. 255. 255. 0").

Next, the solving means 32 goes to Step S8. When requests of reassigning IP addresses are sent from the internal units to the DHCP server section 40, the solving means 32 generates and assigns unique IP addresses to the internal units on the basis of the changed network address and unique host addresses of the internal units.

After executing the Step S8 or if the address duplication is not detected in the Step S2, the solving means 32 requests the other monitoring unit to recheck the address duplication via the means for communicating between the control units (Step S9). Then, the solving means 32 terminates the process. Note that, after the solving means 32 checks the address duplication in all of the monitoring units, requests of checking the address duplication sent to the monitoring units are ignored by the monitoring units.

Internal LAN Fault Clearing Means 34

When a failure occurs in the corresponding internal LAN 12, if the port opening/closing means 28 sets in the open state, the internal LAN fault clearing means 34 changes the state to the close state and communicates to the other control unit 7, by the communicating means, so as to change the state of the control unit 7 to the open state.

Means 38 for Monitoring Internal Unit

The monitoring means 38 monitors the internal units via the internal LAN.

For example, the monitoring means 38 monitors values measured by voltage sensors and temperature sensors (not shown) of the magnetic disk unit 4 in each drive enclosure 10 and each centralized module 2 via the internal LAN 12. When an abnormal value, e.g., a value greater than a threshold value, is detected, the monitoring means 38 sends a command to the faulty internal unit so as to, for example, urgently turn off a power source of the faulty internal unit. Further, the monitoring means 38 sends status data of the faulty internal unit to a management computer connected to the external network N.

Even if no abnormal state occurs, the monitoring means 38 may send statuses of the sensors, which are monitored by the monitoring units 6 and 7, to an external equipment, e.g., the management computer, connected to the external network N.

In comparison with the conventional system, in which a plurality of internal units are connected to serial communication lines, the RAID system R of the present embodiment uses the internal LANS for communication between the monitoring units 6 and 7 and the internal units. With this structure, the communication with many of the internal units can be performed at high speed, and a production cost and a development cost can be reduced. Each of the internal units is connected to the independent LANs 12 and 13, so that they have enough redundancies and fault tolerances of the monitoring units 6 and 7 and the internal LANs 12 and 13 can be improved. Further, in the RAID system R, a plurality of the monitoring units 6 and 7 are physically connected to the external network N via the external network ports 22, and the port opening/closing means 28 makes the external network N recognize the monitoring units 6 and 7 as one unit.

If the network address of the external network N and the network addresses of the internal LANs 12 and 13 are duplicated, an IP address of an equipment connected to the external network N and the IP addresses of the internal units connected to the internal LAN 12 or 13 are accidentally duplicated. If the address duplication occurs, the equipment and the internal unit having the same IP address cannot communicate each other.

Figure 6:
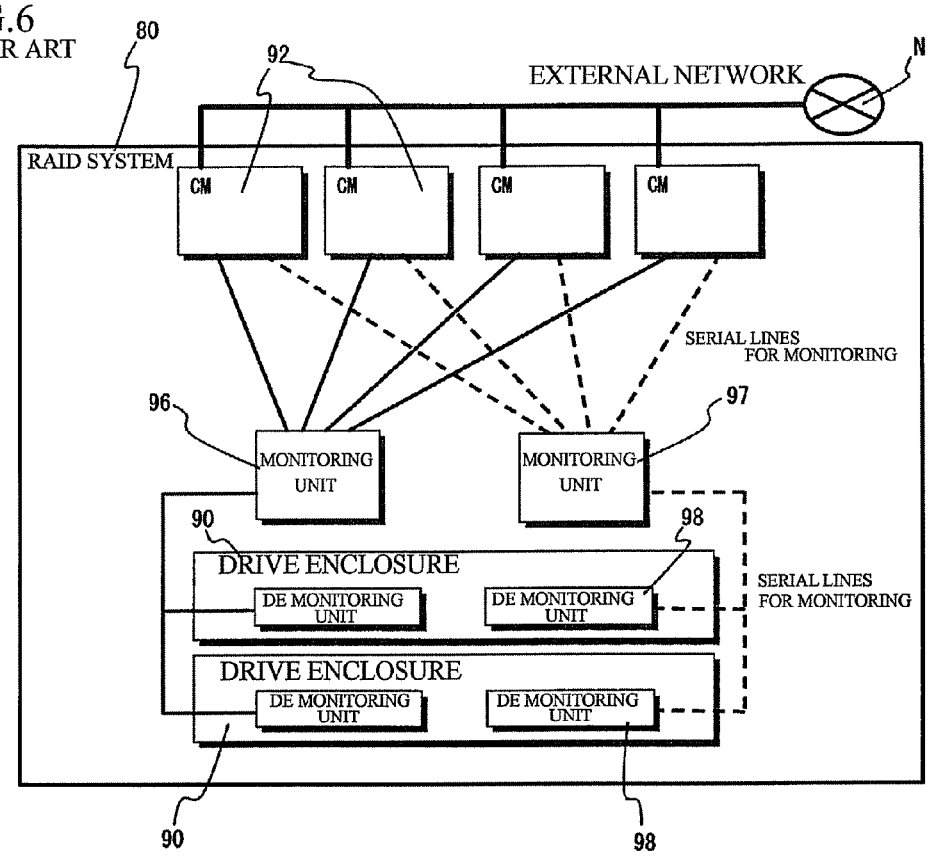
FIG. 6 is a block diagram showing the structure for monitoring the internal units of the conventional storage system.

For example, when the user tries to access the centralized module 2, which is the internal unit via the equipment connected to the external network N, if the IP addresses of the equipment and the centralized module 2 are duplicated, the equipment cannot normally communicate with the centralized module 2. Note that, in the conventional storage system shown in FIG. 6, a user interface function, e.g., a setting console function in which the user can set via an external network, is widely used. To maintain this function, the communication between the equipment connected to the external network and the centralized module will be employed in the future. In the present embodiment, the port opening/closing means 28, the detecting means 30, etc., which performs only the setting console function, may be provided in each of the centralized module 2 so as to actuate the control units 6 and 7 via the centralized module 2.

In the RAID system R of the present embodiment, the solving means 32 is capable of suitably solving the problem of the address duplication between the network addresses of the internal LANs 12 and 13 and that of the external network N.

Especially, even if the network address of the internal LAN corresponding to the monitoring unit, which has been set in the open state, and the network address of the external network N are duplicated, the other monitoring unit is set in the open state and acts as the unit having the prescribed IP address with respect to the external network N, and the duplicated network address of the internal LAN is changed. Therefore, the problem of the address duplication can be solved.

In the above described embodiment, the network communication system of the present invention is used in the RAID system R, but the present invention is not limited to the above described embodiment. The network communication system of the present invention can be applied to many types of systems, in which control units and internal LANs are multiplexed to have enough redundancy and the control units connected to the external network are recognized as one unit, with the common IP address, in the external network.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A network communication system, comprising:
a plurality of internal units;
a plurality of internal LANs mutually connecting said internal units, said internal LANs being assigned different IP addresses; and
a plurality of control units being respectively connected to said internal LANs,
wherein each of said control units includes:
an external network port being capable of connecting to an external network;
port opening/closing means for selectively setting said control unit in an open state, in which said control unit acts as the unit having a common IP address of said control units with respect to the external network, or in a close state, in which an access to said control unit from the external network is prohibited;
means for detecting address duplication between network addresses of the IP addresses, which are respectively assigned to said internal LANs, and a network address assigned to the external network; and
means for solving the address duplication, said solving means actuating said port opening/closing means to set said control unit in the close state and changing the network address of said corresponding internal LAN so as to solve the address duplication, and
wherein one of said control units is set in the open state, and the rest of said control units is set in the close state.

2. The network communication system according to claim 1, further comprising means for communicating between said control units,
wherein said solving means changes the state of said control unit to the close state and communicates to other control units, by said communicating means, so as to change the state of one of other control units to the open state when said detecting means detects the address duplication and said control unit is set in the open state.

3. The network communication system according to claim 1, further comprising:
means for communicating between said control units; and
internal LAN fault clearing means for changing the state of said control unit to the close state and communicating to other control units, by said communicating means, so as to change the state of one of other control units to the open state when a fault occurs in said internal LAN corresponding to said control unit, which is set in the open state.

4. The network communication system according to claim 2,
wherein each of said control units is further connected to other internal LANs, and
said communicating means is constituted by said internal LANs.

5. The network communication system according to claim 3,
wherein each of said control units is further connected to other internal LANs, and
said communicating means is constituted by said internal LANs.

6. The network communication system according to claim 1,
wherein each of said control units includes a DHCP server section, which assigns the IP address to said internal unit connected to the corresponding internal LAN on the basis of DHCP, and
said solving means makes the DHCP server section change the IP address of said internal unit when the network address of the corresponding internal LAN is changed.

7. The network communication system according to claim 1,
wherein said solving mans firstly attempts to solve the address duplication by a manner of class A,
if the address duplication is not solved by the manner of class A, said solving mans attempts to solve the address duplication by a manner of class B, and
if the address duplication is not solved by the manner of class B, said solving mans attempts to solve the address duplication by a manner of class C.

8. The network communication system according to claim 1,
wherein each of said control units further includes means for monitoring said internal units via said corresponding internal LAN, and said monitoring means sends status data of the internal units to an assigned equipment connected to the external network.

9. A storage system, comprising:
a network communication system;
a plurality of storage units, which work as internal units;
a plurality of centralized modules, which are used for accessing said storage units and which work as internal units,
wherein said network communication system comprises:
a plurality of internal LANs mutually connecting said internal units, said internal LANs being assigned different IP addresses; and a plurality of control units being respectively connected to said internal LANs, wherein each of said control units includes:

an external network port being capable of connecting to an external network;

port opening/closing means for selectively setting said control unit in an open state, in which said control unit acts as the unit having a common IP address of said control units with respect to the external network, or in a close state, in which an access to said control unit from the external network is prohibited;

means for detecting address duplication between network addresses of the IP addresses, which are respectively assigned to said internal LANs, and a network address assigned to the external network;

means for solving the address duplication, said solving means actuating said port opening/closing means to set said control unit in the close state and changing the network address of said corresponding internal LAN so as to solve the address duplication; and means for monitoring said internal units via said corresponding internal LAN, and said monitoring means sends status data of the internal units to an assigned equipment connected to the external network, and wherein one of said control units is set in the open state, and the rest of said control units is set in the close state.

* * * * *